United States Patent [19]
Sugahara et al.

[11] Patent Number: 5,285,338
[45] Date of Patent: Feb. 8, 1994

[54] LOADING/UNLOADING MECHANISM FOR READ AND/OR WRITE HEAD

[75] Inventors: Takamitsu Sugahara; Junji Kawada, both of Kamakura, Japan

[73] Assignee: Mitsubisi Denki Kabushiki Kaisha, Tokyo, Japan

[21] Appl. No.: 936,066

[22] Filed: Aug. 26, 1992

Related U.S. Application Data

[63] Continuation of Ser. No. 592,133, Oct. 3, 1990, abandoned.

[30] Foreign Application Priority Data

Oct. 6, 1989 [JP] Japan .................. 1-262352

[51] Int. Cl.⁵ .................. G11B 5/54; G11B 21/22
[52] U.S. Cl. .................. 360/105; 360/104
[58] Field of Search ............ 360/105, 104, 106, 133

[56] References Cited

U.S. PATENT DOCUMENTS

| | | | |
|---|---|---|---|
| 3,896,495 | 7/1975 | Beecroft | 360/105 |
| 3,984,873 | 10/1976 | Pejcha | 360/105 |
| 4,206,489 | 6/1980 | Manzke et al. | 360/105 |
| 4,302,789 | 11/1981 | Vos | 360/105 |
| 4,376,294 | 3/1983 | Meier et al. | 360/105 |
| 4,644,429 | 2/1987 | Boe | 360/105 |
| 4,742,410 | 5/1988 | Smith | 360/105 |
| 4,787,000 | 11/1988 | Schulze | 360/105 |
| 4,829,396 | 5/1989 | Okutsu | 360/105 |
| 5,023,737 | 6/1991 | Yaeger | 360/105 |
| 5,057,954 | 10/1991 | O'Sullivan et al. | 360/105 |

FOREIGN PATENT DOCUMENTS

| | | |
|---|---|---|
| 3625252 | 1/1987 | Fed. Rep. of Germany . |
| 0008313 | 9/1989 | PCT Int'l Appl. . |

*Primary Examiner*—A. J. Heinz
*Assistant Examiner*—Kevin M. Watkins
*Attorney, Agent, or Firm*—Wolf, Greenfield & Sacks

[57] ABSTRACT

A mechanism for a loading/unloading read and/or write head of a disk drive apparatus against a magnetic disk, includes a lifter which bends a suspension supporting the read and/or write head. The suspension is bent by moving a lifter up responsive to movement of the read and/or write head to detach the read and/or write head retained on a tip of the suspension from the magnetic disk by a given distance, thereby a high shock resistance is obtained.

21 Claims, 7 Drawing Sheets

LOADING/UNLOADING MECHANISM FOR READ AND/OR WRITE HEAD

This application is a continuation of application Ser. No. 07/592,133, filed Oct. 3, 1990, now abandoned.

BACKGROUND OF THE INVENTION

1. Field of the Invention

The present invention relates to a loading/unloading mechanism for read and/or write head used in a disk drive apparatus which drives a disk recording medium, particularly, it relates to simplification of its structure.

2. Description of Related Arts

Figure 1:
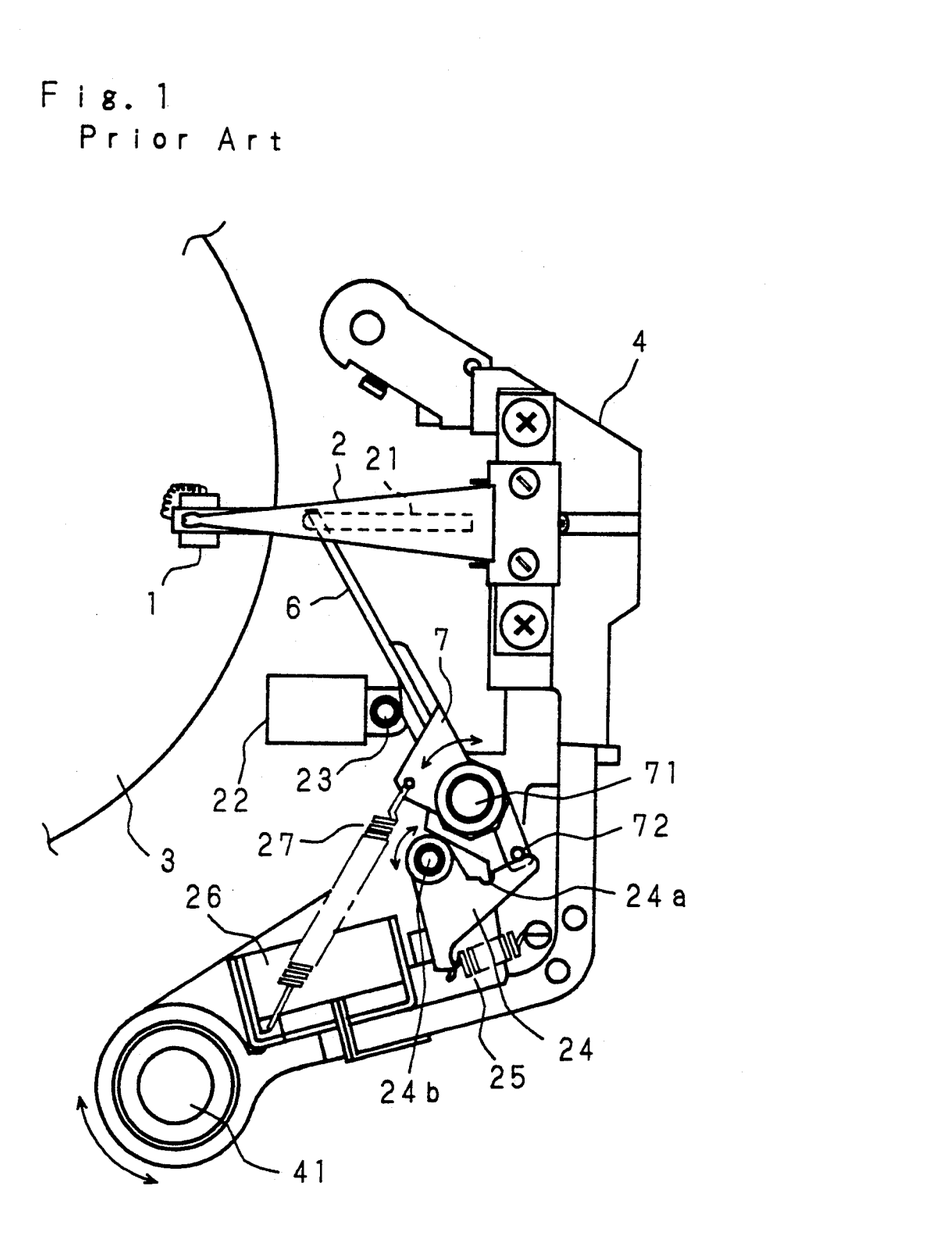
FIG. 1 is a plan view showing a conventional head loading and unloading mechanism.
Figure 2:
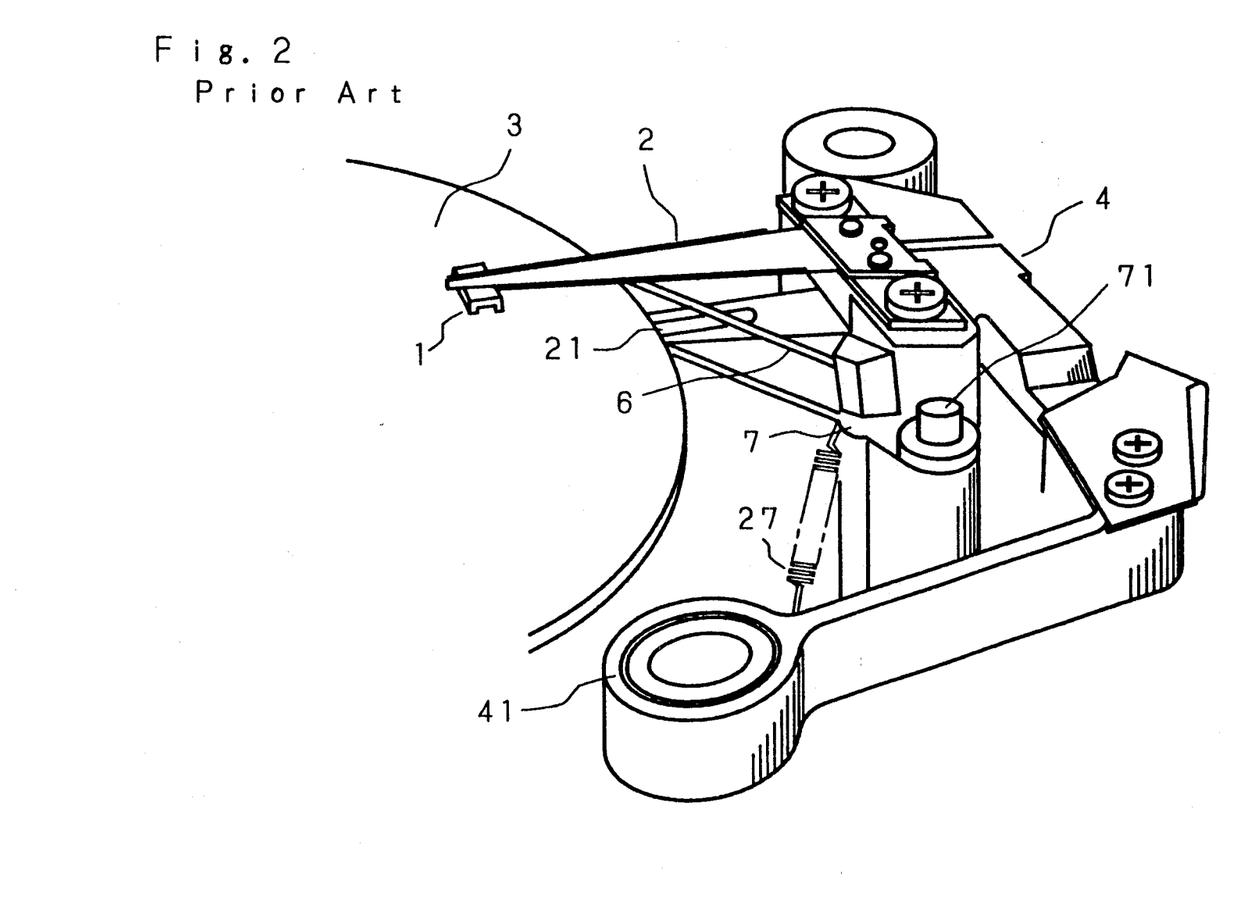
FIG. 2 is a perspective view of the mechanism shown in FIG. 1.

FIG. 1 is a plan view showing an example of a loading/unloading mechanism of a conventional disk drive apparatus published in "NIKKEI ELECTRONICS", 1986, 3-24, No. 391, pp 90 to pp 99, and FIG. 2 is a perspective view showing its structure. In the figure, numeral 1 indicates a sliding-type read and/or write head which reads and/or writes a magnetic disk 3. The read and/or write head 1 is installed on a tip of a tapered suspension 2 and supported thereon so as to be urged in a direction contacting to the magnetic disk 3. In the midway of the suspension 2, a cam 21 is engaged with a lifter 6 to be described later. The base end of the suspension 2 is mounted on an actuator 4 which swings about a pivot shaft 41. Actuator 4 is formed in a shape of a sickle and in the midway thereof, projects a strut 71 which serves as a rotating center of a link arm 7 supporting the lifter 6. The link arm 7 is provided with the bar lifter 6 on its one end, and on the other end, a cam pin 72 engaged with a latching cam 24 to be described later. The link arm 7 is urged counterclockwise by means of a spring 27, and the counterclockwise movement of the lifter 6 is regulated by a stopper pin 23 contacting its base end. The stopper pin 23 is movable up and down by a loading solenoid 22. The latching cam 24 is for retaining the lifter 6 in the vicinity of the root of the suspension 2, and is provided with a latch groove 24a engaged with the cam pin 72 on its periphery. The latching cam 24 swings about a pivot 24b and is usually urged counterclockwise by a latching spring 25. Thereby, the latching groove 24a and the cam pin 72 are kept in contact when they are engaged with each other. The latching cam 24 is rotated clockwise by a cam releasing solenoid 26 to release the engagement between the latch groove 24a and the cam pin 72.

Next, the loading and unloading operation for the conventional loading/unloading mechanism of the read and/or write head will be described.

Referring to FIG. 1, first, the case where the read and/or write head 1 moves from the unloading state in which it is detached from the magnetic disk 3, to the loading state in which it contacts to the magnetic disk 3 is described.

The actuator 4 is rotated about the pivot shaft 41 to bring the head 1 to the outermost periphery of the medium 3. Next, the solenoid 22 is energized to project the stopper pin 23. Then, while a portion of the link arm 7 to which the lifter 6 is fixed is caught by the pin 23, the actuator 4 is rotated reversely in an inner circumferential direction. At this time, since the strut 71 of the link arm 7 is fixed to the actuator 4, the link arm 7 is rotated in the opposite direction of the rotation of the actuator arm 4 or clockwise in FIG. 1, and the lifter 6 is moved in the releasing direction of the cam 21, disposed on the suspension 2. Thus, the head 1 is contacted to the magnetic disk 3 to achieve the loading state. The cam pin 72 is fixed to a portion of the link arm 7 and is moved to the position where it is caught by the latch groove 24a, provided on the cam 24, pre-loaded by the cam spring 25. Furthermore, the solenoid 22 is released and the pin 23 is retracted to complete the loading operation.

Next, the unloading operation for detaching the head 1 from the magnetic disk 3 is described. When the current preserved in a capacitor and the like, not shown, is applied to the cam releasing solenoid 26, installed on the actuator 4, as a result of the power source of the disk drive apparatus being cut off, a portion of the cam 24 is attracted and cam 24 is rotated clockwise, thereby the cam pin 72 caught by the latch groove 24a is released. As a result, the link arm 7 is rotated in the direction in which the lifter 6 approaches to the head 1 by the unloading spring 27, or counterclockwise in FIG. 1, and the head 1 is detached from the magnetic disk 3 to complete the unloading operation.

Figure 3:
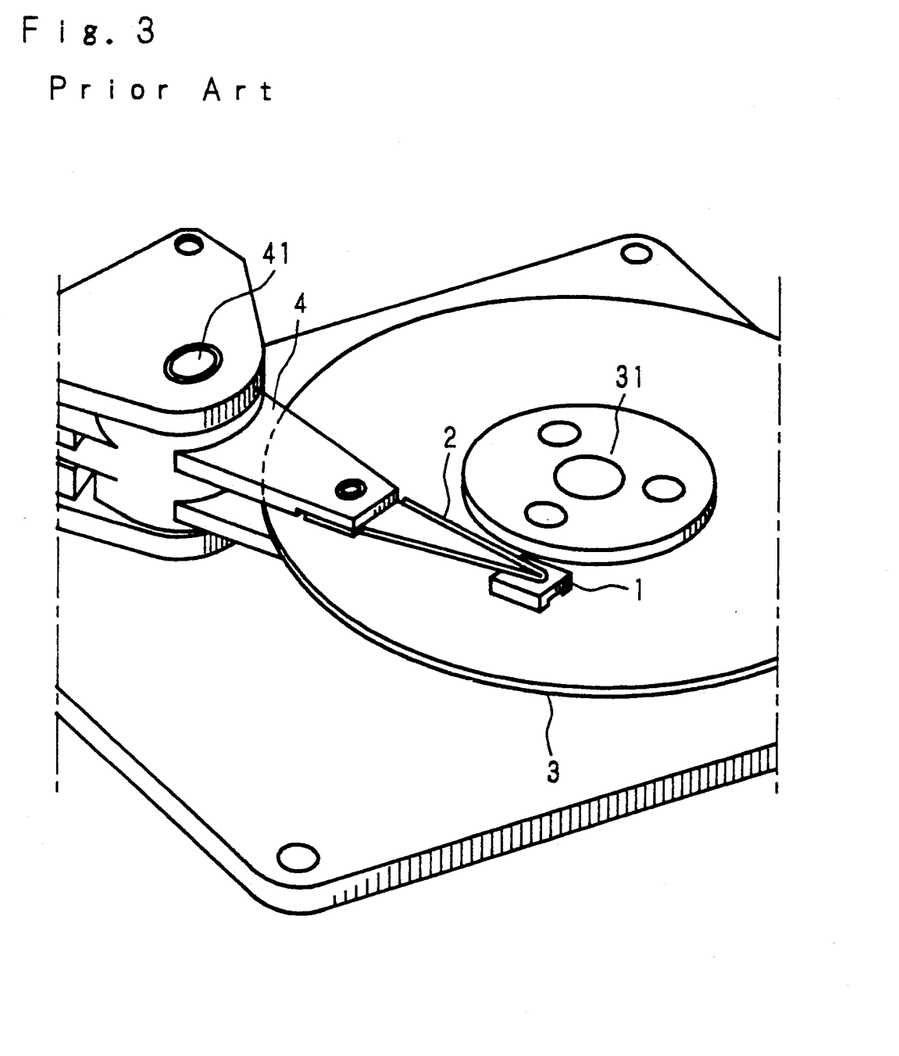
FIG. 3 is a perspective view showing a conventional contact start and stop system.

FIG. 3 is a perspective view showing a configuration of a conventional disk drive apparatus of a contact start and stop system (CSS), in which the read and/or write head is neither loaded nor unloaded. In the figure, numeral 31 designates a spindle motor which rotates the magnetic disk 3 and in the CSS system, keeps the read and/or write head 1 standstill on a shipping zone on the innermost periphery of the magnetic disk 3 at a time of non-operation. The read and/or write head 1 is installed on a tip of the suspension 2. The base end of the suspension 2 is mounted on a tip of the actuator 4. The actuator 4 swings about the pivot shaft 41.

When starting the disk drive apparatus of the CSS system, the spindle motor 31 is rotated while keeping the read and/or write head 1 standing still on the magnetic disk 3. In general, the head 1 is kept standstill at the inner circumference side on the magnetic disk 3. Though the head 1 rubs the magnetic disk 3 in the beginning, when a given revolution speed is achieved, it starts to float above the magnetic disk 3 by the air bearing effect. At normal revolution of the spindle motor, it floats at a constant height of about 0.2 $\mu$m. When the disk drive apparatus is stopped and the revolution of the spindle motor reduces to a certain revolution speed, the head 1 begins to contact with the magnetic disk 3 and keeps rubbing the magnetic disk 3 until the spindle motor stops. Accordingly, it has been devised to stop the spindle motor positively for shortening the sliding distance.

Since the conventional head loading and unloading mechanism is constituted as aforementioned, the number of component parts increases, and it is necessary to insure a wide region for component parts and a region in which the lifter moves to unload the read and/or write head. Also, sequential operations for operating the component parts in constant order are necessitated, resulting in uncertainty of operation and frequent troubles. Moreover, there are such problems as complicated assembling and a high cost.

Meanwhile in the conventional CSS system, the lower the floating height of the read and/or write head from the magnetic disk, the less the frequency of contact start and stop, resulting in a shorter life. The higher the recording density the lower must be the floating height, resulting in the longer rubbing distance between the head and the magnetic disk thus causing problems. Also, as the head contacts directly to the medium the vibration and shock resistance at the time of non-operation is limited. Besides, when the number of magnetic disks increases and contact resistance of the read and/or write head therewith becomes larger, the starting torque of the spindle motor must be increased that much. In this system, since the motor is not reversible, angular position detecting means of certain accuracy must be provided in a spindle motor driving circuit. Furthermore, it is also necessary to provide means for reducing the idling time of the spindle motor at the time of interruption of the power source.

SUMMARY OF THE INVENTION

The present invention has been devised in view of such circumstances, therefore, it is an object of the present invention to provide a loading/unloading mechanism for read and/or write head in which component parts can be reduced.

It is another object of the present invention to provide a loading/unloading mechanism for read and/or write head, in which the read and/or write head can be detached by a given distance from a magnetic disk in a narrow region, and in which the read and/or write head can be retracted outside a periphery of a disk as the magnetic disk.

In order to achieve these objects, a loading and unloading mechanism for a read and/or write head is constructed such that a lifter is moved up and down to lift a suspension of the read and/or write head, thereby lifting the read and/or write head from the magnetic disk. Furthermore, the suspension of the read and/or write head is moved on the lifter to the outside of the magnetic disk. Moreover, the lifter is moved by a portion of an actuator arm which moves and positions the read and/or write head.

When the actuator arm which moves and positions the read and/or write head moves beyond the outermost periphery of the magnetic disk, the lifter lifts the suspension of the head to detach the head from the magnetic disk. Moreover, while detaching the head from the magnetic disk, the suspension is slid on the lifter to move and retract the head to the outside of the region of the magnetic disk in a retained manner.

The above and further objects and features of the invention will become more fully apparent from the following detailed description with accompanying drawings.

DESCRIPTION OF THE PREFERRED EMBODIMENTS

Figure 4:
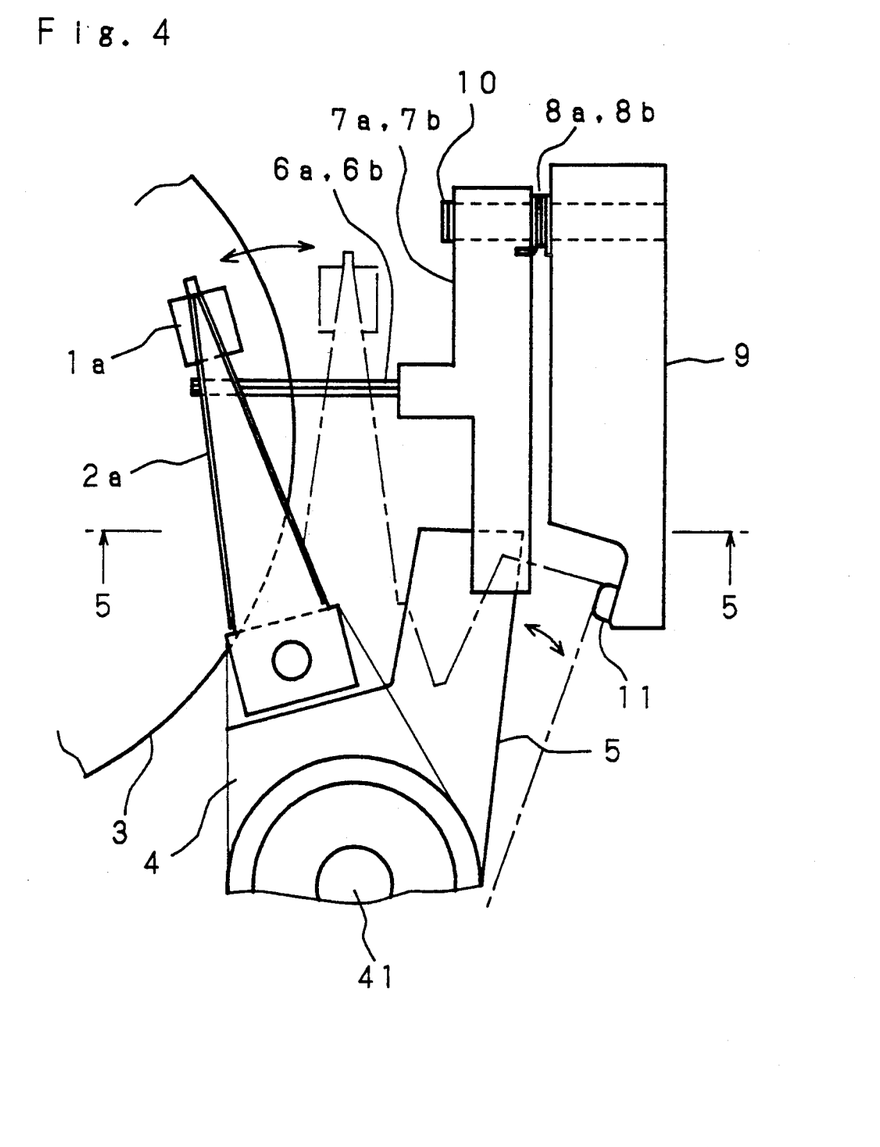
FIG. 4 is a plan view showing a head loading and unloading mechanism according to one embodiment of the present invention.
Figure 5:
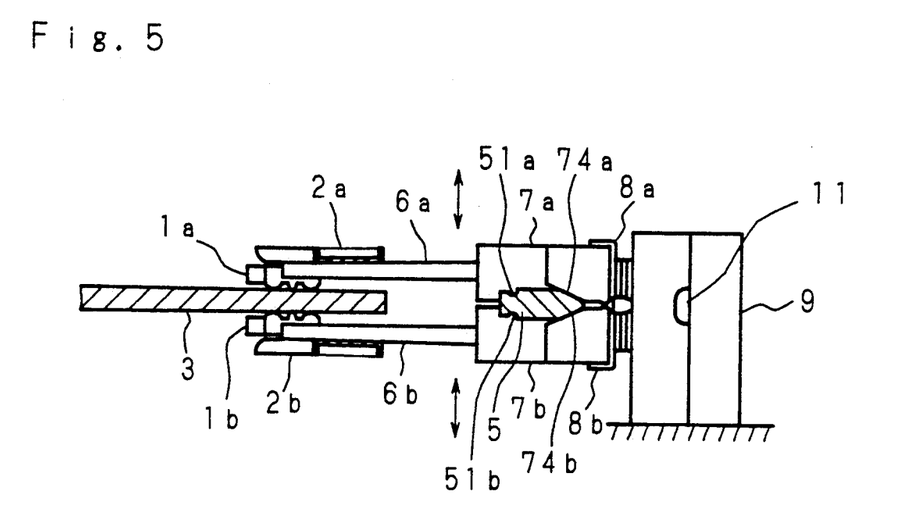
FIG. 5 and FIG. 6 are sectional views taking along the line 5.5 of FIG. 4.

In the following, the present invention will be described with reference to the drawings showing its embodiments. In FIGS. 4 and 5, numerals 1a, 1b designate sliding-type read and/or write heads which read and write both sides of a magnetic disk 3, the read and/or write heads 1a, 1b being installed on tips of tapered suspensions 2a, 2b and supported thereon so as to be urged in the directions contacting to the magnetic disk 3. The base end of the suspensions 2a, 2b are mounted on an actuator 4 which swings about a pivot shaft 41, and by the swinging motion of the actuator 4, the read and/or write heads 1a, 1b swing in the substantially radial direction of the magnetic disk 3. To the actuator 4, an arm 5 having a bullet-shaped section and formed with grooves 51a, 51b on the upper and lower surfaces is joined. The arm 5 moves integrally with the actuator 4. Between the suspension 2 and the magnetic disk 3, bar lifters 6a, 6b extend longitudinally in the radial direction of the magnetic disk 3 interposed between the disk 3 and the suspensions 2a, 2b. Tips of the lifters 6a, 6b are located slightly inside from the peripheral edge of the magnetic disk 3, and their base ends are mounted on link arms 7a, 7b. The link arms 7a, 7b are in the shape of flat bar and extending longitudinally in the tangential direction of the magnetic disk 3. The link arms 7a, 7b are facing each other and provided with protrusions extending in the radial direction to receive the base ends of the lifters 6a, 6b. The link arms 7a, 7b clamp a strut 10 at one end and swing about the strut 10. The other end of the link arms 7a, 7b are formed with tapered portions 74a, 74b therebetween, into which the arm 5 is penetrated. When the arm 5 penetrates into the tapered portions 74a, 74b, the link arms 7a, 7b swing respectively in the different rotating directions. By this swinging motion, the lifters 6a, 6b lift the suspensions 2a, 2b to detach the read and/or write heads 1a, 1b from the magnetic disk 3. The link arms 7a, 7b are urged respectively in the different rotating directions by means of springs 8a, 8b wound around the strut 10. The strut 10 is fixed to one end of the support 9 in an axial direction which is substantially parallel to a recording surface of the magnetic disk 3. On the other end of the support 9, a stopper 11 for regulating the swinging motion of the arm 5 is disposed.

Next, the operation of the loading/unloading mechanism of the invention will be described.

Figure 6:
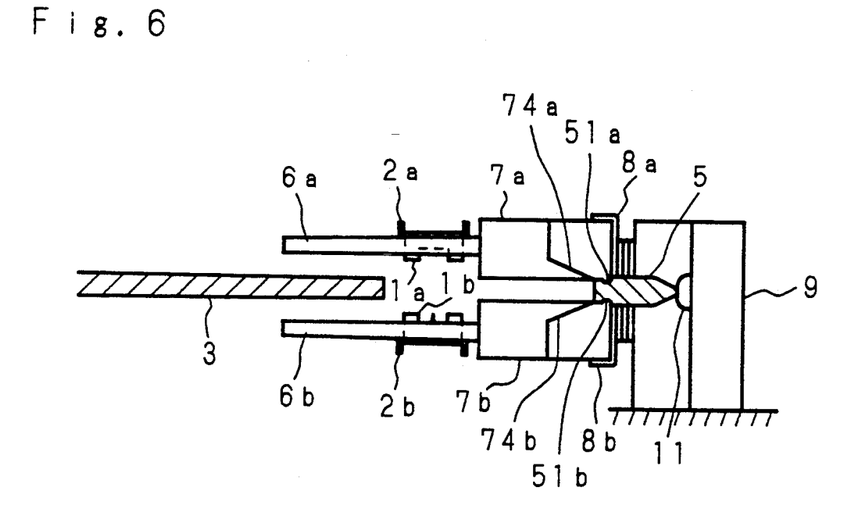

First, the unloading operation is described. As shown in FIG. 5 and FIG. 6, as the actuator 4 is driven clockwise and the read and/or write heads 1a, 1b approach the peripheral edge of the magnetic disk 3, the arm 5 whose end is formed into a bullet shaped cam structure penetrates between the tapered portions 74a, 74b of the tapered link arms 7a, 7b, and the link arms 7a, 7b are rotated about the strut installed on the support 9 of the link arm, whereby the lifters 6a, 6b are moved up and down and the suspensions 2a, 2b are lifted. As a result, the read and/or write heads 1a, 1b are detached from the magnetic disk 3 by a given distance, and further, the arm 5 abuts against the stopper 11, thereby the link arms 7a, 7b engage with the grooves 51a, 51b provided on the tip of the arm 5 and are latched. At this time, the heads 1a, 1b move in the state of being detached from the magnetic disk 3 and are retracted further to the outside of the peripheral edge of the magnetic disk 3. This operation is effected at the time of the standstill of the disk drive apparatus and at the time of an emergency when some troubles have occurred.

Next, the loading operation will be described. When the actuator 4 is driven counterclockwise from the unloading state as aforementioned, the latching state between the link arms 7a, 7b and the arm 5 is released, and the heads 1a, 1b are brought to the loading state by the operation which is completely opposite from the unloading operation.

In the aforesaid embodiment, though the swinging type actuator 4 has been described, a linear driving type actuator may also be used.

Also, in the embodiment aforementioned, though a bar lifter 6 has been described, a plate lifter may also be used.

Figure 7:
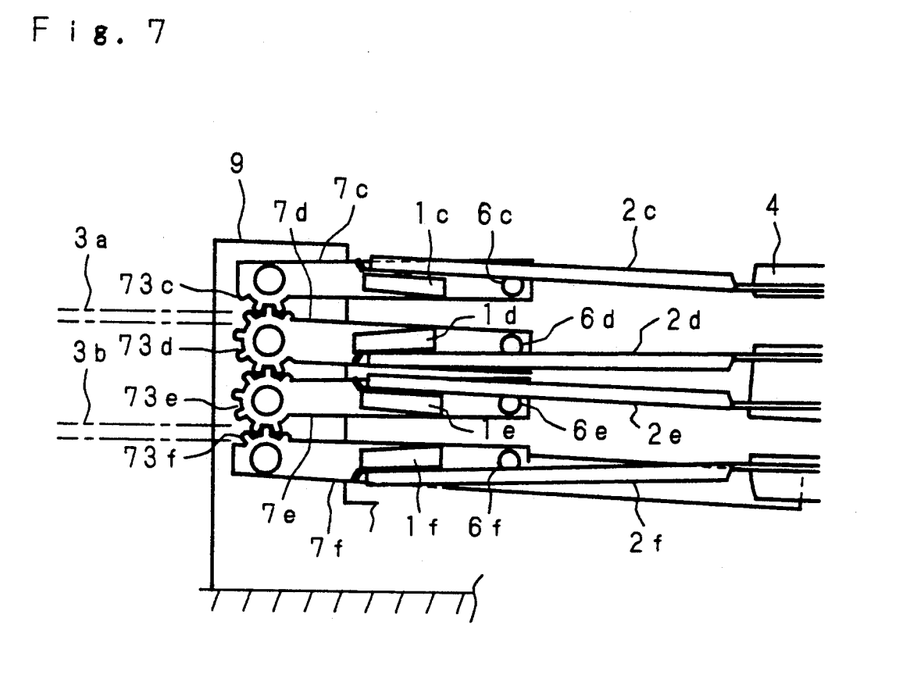
FIG. 7 is a sectional view of a head loading and unloading mechanism showing another embodiment of the present invention.

Moreover, in the embodiment mentioned above, though the case in which one magnetic disk and two read and/or write heads has been described, one or more magnetic disks and two or more heads, as shown in FIG. 7, may also be used for the same effect as the aforesaid embodiment. In this case, when connecting the link arms 7c, 7d, 7e and 7f with the gear mechanism 73c, 73d, 73e and 73f and moving, for example, only a portion 73f of the gear mechanism by the actuator 4, the other link arms 7c, 7d and 7e may be designed to interlock with each other. Here, in FIG. 7, 1c, 1d, 1e and 1f are read and/or write heads, 2c, 2d, 2e and 2f are suspensions, 3a, 3b are magnetic disk and 6c, 6d, 6e and of 6f are lifters.

Meanwhile, the read and/or write head may be a read head or a write head.

As stated above, according to the present invention, since the read and/or write head is so constructed as to detach from the magnetic disk, life of a storing apparatus is prolonged and high reliability can be obtained.

Also, the head is moved to and retained at the outside of the peripheral edge of the medium, so that it may be detached by only a little and a high shock resistance can be obtained.

Also, by the retracting immediately at an emergency, recording data on the medium is not spoiled.

Besides, since the damping distance at the time of runaway is not influenced by the allowance of the medium, it can be longer and deceleration can be reduced.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed:

1. A loading/unloading mechanism for a read and/or write head which is supported by a suspension and moves above/on a magnetic disk, said mechanism comprising, a lifter which is mounted to a support disposed in a fixed position outside of the circumferential periphery of the disk, the lifter including a lifter member extending from the lifter and interposed between the disk and the suspension, the lifter further including means for moving toward and away from the surface of said magnetic disk; and driving means for mechanically engaging the lifter, said driving means being affixed to said suspension in a position that engages the lifter when the head is moved to a peripheral edge of said disk so as to cause the lifter to move away from the disk and thereby cause the lifter member to lift the suspension away from the disk.

2. A loading/unloading mechanism for read and/or write head as set forth in claim 1, wherein said driving means, when said read and/or write head approaches the peripheral edge of said magnetic disk, moves said lifter away from said magnetic disk, and moves said read and/or write head away from said magnetic disk at a predetermined distance.

3. A loading/unloading mechanism for a read and/or write head which is supported by a suspension and moves above/on a magnetic disk, said mechanism comprising, a lifter having a lifter member and a link arm, the lifter member being connected to the link arm and extending therefrom so as to be interposed between the disk and the suspension, the link arm being mounted to a support that is fixed to a stationary location outside of the circumferential periphery of the disk and having means for moving toward and away from the surface of said magnetic disk, actuator means for supporting and radially moving said suspension, the actuator means having means for mechanically engaging said link arm; and wherein the means for mechanically engaging is disposed on the actuator means such that when the read and/or write head moves toward the peripheral edge of said disk, the means for mechanically engaging said link arm engages the link arm so as to move said link arm and in turn said lifter member and said suspension away from the recording surface of the disk.

4. A loading/unloading mechanism for at least one read and/or write head, said mechanism comprising:

suspension means including at least one suspension arm for supporting said at least one head, each suspension arm of said at least one suspension arm supporting one head at the end of said suspension arm, each head being supported above a corresponding disk from at least one magnetic disk;

lifting means for lifting said at least one suspension arm away from the at least one magnetic disk, said lifting means being mounted on a support that is fixed to a stationary location outside of the circumferential periphery of the at least one disk and having at least one lifting member extending therefrom and interposed between the at least one suspension arm and the at least one disk, the lifting means having means for moving toward and away from the surface of the at least one disk;

mechanical actuating means for mechanically engaging said lifting means, said mechanical actuating means being affixed to said suspension means in a position such that when said at least one suspension arm moves toward a peripheral edge of said at least one disk, said mechanical actuating means engages said lifting means to cause the lifting means to move away from the at least one disk, thereby causing the at least one lifting member to lift the at least one head off the at least one disk.

5. The loading mechanism of claim 4 wherein said suspension arms are tapered and on the tip of each said tapered arm is mounted one of said heads.

6. The mechanism of claim 5 wherein said lifting means comprises:

at least one link arm mounted to a strut on the support; and wherein the at least one lifter member is oriented in a substantially radial direction with said at least one disk and connected to a corresponding link arm from said at least one link arm.

7. The mechanism of claim 6 wherein each link arm has a tapered portion to receive said mechanical actuating means.

8. The mechanism of claim 6 wherein said mechanical actuating means has a bullet-shaped section to engage said at least one link arm.

9. A loading/unloading mechanism for a read and/or write head which moves toward and away from a magnetic disk, said mechanism comprising:
- a suspension carrying said head,
- an actuating means for supporting said suspension and for moving said suspension in a substantially radial direction of said disk, said actuating means having an engaging arm extending away from the longitudinal axis of the suspension, and
- a lifter means for lifting said suspension, said lifter means being mounted on a support, fixed to a stationary location outside the circumferential periphery of the disk, said lifter means including a lifter member extending from the lifter means and interposed between said magnetic disk and said suspension, said lifter means further including mechanical engagement means for engaging said engaging arm and further including means for moving toward and away from the disk surface wherein when said actuating means moves said head toward the peripheral edge of said disk, the mechanical engagement means engages the engaging arm and causes said lifter means to lift the suspension away from the surface of said disk.

10. A mechanism as set forth in claim 9 wherein said lifter means further comprises:
- a link arm connected to said lifter member, said link arm being mounted on a strut of the support and wherein said link arm includes the mechanical engagement means.

11. A mechanism as set forth in claim 10 wherein said actuating means is an actuator which is pivotally mounted and includes an engaging arm which engages said link arm when said actuator moves said head near the peripheral edge of said disk.

12. A mechanism for loading and unloading a read and/or write head above a magnetic disk surface, said mechanism comprising:
- a suspension for carrying the head,
- an actuator, supporting the suspension, having means for rotating the suspension about an axis orthogonal to the disk surface,
- a lifter including a lifter member and means for moving the lifter member, the lifter member being interposed between the suspension and the surface of the disk, and
- wherein the actuator includes means for mechanically engaging the lifter, the means for mechanically engaging being disposed such that when the head is rotated toward the peripheral edge of the disk the lifter is engaged so as to cause the means for moving to move the lifter member and lift the suspension away from the surface of the disk, wherein the lifter further comprises a link arm, connected to the lifter member, the link arm being mounted on a strut of a support that is fixed to a stationary location outside of the circumferential periphery of the disk, wherein when the means for mechanically engaging engages the lifter the link arm rotates about the strut.

13. A mechanism as set forth in claim 12 wherein the lifter has a tapered section and the means for mechanically engaging has a leading section which is bullet-shaped so as to drive the lifter in a wedge-like manner when the means for mechanically engaging engages the lifter.

14. A mechanism as set forth in claim 13 wherein the means for mechanically engaging has a trailing section with a groove to catch an edge of the tapered section so as to lock the lifter in an up position.

15. A mechanism as set forth in claim 12 wherein the means for mechanically engaging is an arm extending away from the actuator and away from the longitudinal axis of the suspension.

16. A mechanism for loading and unloading a read and/or write head above a magnetic disk surface, said mechanism comprising:
- a suspension, carrying the head,
- an actuator, supporting the suspension, having means for moving the suspension over the disk surface,
- a lifter member,
- a lifting means for lifting the lifter member, the lifting means being fixed to a stationary location outside of the circumferential periphery of the disk, the lifting member being connected to the lifting means and extending therefrom interposed between the suspension and the surface of the disk, and
- wherein the actuator includes means for mechanically engaging the lifting means disposed such that when the head moves toward the peripheral edge of the disk, the means for mechanically engaging engages the lifting means to cause the lifting means to lift the lifter member, thereby lifting the suspension away from the surface of the disk.

17. A mechanism as set forth in claim 16 wherein the lifting means comprises
- a link arm mounted on a strut of a support that is fixed outside the circumferential periphery of the disk, wherein when the means for mechanically engaging engages the lifting means the link arm rotates about the strut.

18. A mechanism as set forth in claim 17 wherein the support includes a stopper disposed such that the means for mechanically engaging will contact the stopper when the head is carried past the peripheral edge of the disk.

19. A mechanism as set forth in claim 16 wherein the lifting means has a tapered section and the means for mechanically engaging has a leading section which is bullet-shaped so as drive the lifting means in a wedge-like manner when the means for mechanically engaging engages the lifting means.

20. A mechanism as set forth in claim 19 wherein the means for mechanically engaging has a trailing section with a groove to catch an edge of the tapered section so as to lock the lifter in an up position.

21. A mechanism as set forth in claim 16 wherein the means for mechanically engaging is an arm extending away from the actuator and away from the longitudinal axis of the suspension.

* * * * *